(12) United States Patent
Pool et al.

(10) Patent No.: US 10,392,963 B2
(45) Date of Patent: Aug. 27, 2019

(54) SYSTEMS AND METHODS RELATED TO TRANSMITTING AND RECEIVING SENSOR DATA

(71) Applicant: General Electric Company, Schenectady, NY (US)

(72) Inventors: Eric Thomas Pool, Roswell, GA (US); David Benjamin Hack, Wilmington, NC (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 15/629,359

(22) Filed: Jun. 21, 2017

(65) Prior Publication Data
US 2018/0371940 A1    Dec. 27, 2018

(51) Int. Cl.
*F01D 21/00* (2006.01)
*H04L 12/26* (2006.01)

(52) U.S. Cl.
CPC ............ *F01D 21/003* (2013.01); *H04L 43/08* (2013.01); *H04L 43/0852* (2013.01); *H04L 43/10* (2013.01); *F05D 2220/31* (2013.01); *F05D 2220/32* (2013.01)

(58) Field of Classification Search
CPC ..... H04L 43/0852; H04L 43/08; H04L 43/10; F01D 21/003; F05D 2220/32; F05D 2220/31
See application file for complete search history.

(56) References Cited

U.S. PATENT DOCUMENTS

| | | |
|---|---|---|
| 8,954,972 B2 | 2/2015 | Lam et al. |
| 9,300,712 B2 | 3/2016 | Nick et al. |
| 2004/0042832 A1* | 3/2004 | Schuppan ............... G06K 15/00 400/61 |
| 2017/0078965 A1* | 3/2017 | Chen ................. H04W 52/0225 |

* cited by examiner

*Primary Examiner* — Bryan Bui
(74) *Attorney, Agent, or Firm* — James W. Pemrick; Frank A. Landgraff

(57) ABSTRACT

A system for transmitting discrete data packets of sensor measured values of operating parameters. The system includes a transmitting device configured to transmit the measured values per a transmittal protocol. The system includes a receiving device that receives the measured values processes the received measured values in accordance with a receiving protocol. The transmittal protocol includes: determining a most recent measured value for the sensor; selecting previous measured values for the sensor; comparing the most recent measured value to the previous measured values to determine a difference therebetween; and conditionally transmitting the most recent measured value based on the difference. The receiving protocol includes: determining a most recent received measured value for each of the sensors; deriving an analytic time based the most recent received measured values; and deriving a time-aligned value for one of the operating parameters measured by the sensors at the analytic time.

20 Claims, 7 Drawing Sheets

SYSTEMS AND METHODS RELATED TO TRANSMITTING AND RECEIVING SENSOR DATA

BACKGROUND OF THE INVENTION

The present invention relates to systems and methods for transmitting and receiving remote sensor data and, more particularly, but not by way of limitation, to distributed systems and processes for acquiring remote data via communication protocols that enhance or optimize data transmission and validation speeds while reducing the amount of data required for transmission.

Industrial machines or assets, generally, are engineered to perform particular tasks as part of a business enterprise or process. Such assets may include, among other things, gas and steam turbines that drive power plants, wind turbines that generate electricity on wind farms, various types of manufacturing equipment on production lines, aircraft and train engines, and the drilling equipment used in mining operations. As will be appreciated, the efficient implementation of any of these types of industrial assets is a complex design challenge, which, to be successful, must anticipate both the physics of the task at hand as well as the environment in which the assets are expected to operate.

As part of this implementation, software and hardware-based controllers have long been the preferred solution for driving the operation of industrial assets. However, with the rise of inexpensive cloud computing, increasing sensor capabilities and decreasing sensor costs, as well as the proliferation of mobile technologies and networking capabilities, new possibilities have arisen to reshape how industrial assets are designed, operated, and maintained. Specifically, recent advances in sensor technologies now enable the harvesting of new types and vastly more operational data, while progress in network speed and capacity allows essentially real-time transmission of this data to distant locations. This means, for example, that even for a geographical dispersed fleet of like industrial assets, the increased amounts of data gathered at each remote site may be efficiently brought together, analyzed, and employed in ways aimed at improving both fleet and individual asset performance. As a consequence of this evolving and data-intensive environment, new opportunities arise to enhance the value of industrial assets through novel industrial-focused hardware and software solutions.

As a result, there is a significant need for efficient ways to gather and transmit sensor data to remote locations. It is common for such sensing systems to have a multitude of sensors, each of which measures a particular operating parameter or changes to such parameter. These sensors may be remotely located relative a computerized controller intended to respond to the data received from the sensors. For example, remote monitoring of gas turbines, especially industrial gas turbines, has become increasingly common. Technicians employed by a manufacturer of the gas turbine may remotely analyze information regarding the operation of the gas turbine and prescribe corrective steps, such as parts replacements or operational adjustments, which may then be performed by on-site operators. Remotely analyzing and diagnosing data collected from a gas turbine and computing accurate information regarding the combustion dynamic levels of the gas turbine becomes a useful enabler for above activities.

In general, prior art sensor networks rely on central monitoring units and require complex signal processing arrangements and processes to effectively manage data generated by sensors. Given the ever-increasing levels of data being generated by new sensing technologies, the efficient transmission of data and, more particularly, the efficient transmission of sensor data for timely use in analytics presents an ongoing challenge.

BRIEF DESCRIPTION OF THE INVENTION

The present application thus a computer-implemented system for transmitting data originating from sensors that periodically measure respective operating parameters for generating respective measured values thereof. The operating parameters may describe respective physical aspects of an operation of an industrial machine. The data may be transmitted in discrete data packets that each includes at least one of the measured values. The system may include a transmitting device communicatively linked to each of the sensors. The transmitting device may be configured to transmit the measured values within the data packets in accordance with a transmittal protocol. The system may include a receiving device that receives the measured values transmitted within the data packets from the transmitting device. The receiving device may process the received measured values in accordance with a receiving protocol. The system may include one or more hardware processors and a machine-readable storage medium on which is stored instructions that cause the one or more hardware processors to execute the transmittal protocol and the receiving protocol. The measured values each may comprise at least the following information: the operating parameter that was measured; a value of the measurement; and a measurement time indicating a time when the measurement was made. The transmittal protocol may include the transmitting device applying the following steps to the measured values of the operating parameters provided to the transmitting device by each of the sensors: determining a most recent measured value for the sensor; selecting previous measured values for the sensor; comparing the most recent measured value to the previous measured values to determine a difference therebetween; and conditionally transmitting the most recent measured value based on the difference. The receiving protocol may include the steps of: determining a most recent received measured value for each of the sensors; deriving an analytic time based the most recent received measured values for each of the sensors; and deriving a time-aligned value for at least one of the operating parameters measured by the sensors at the analytic time.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
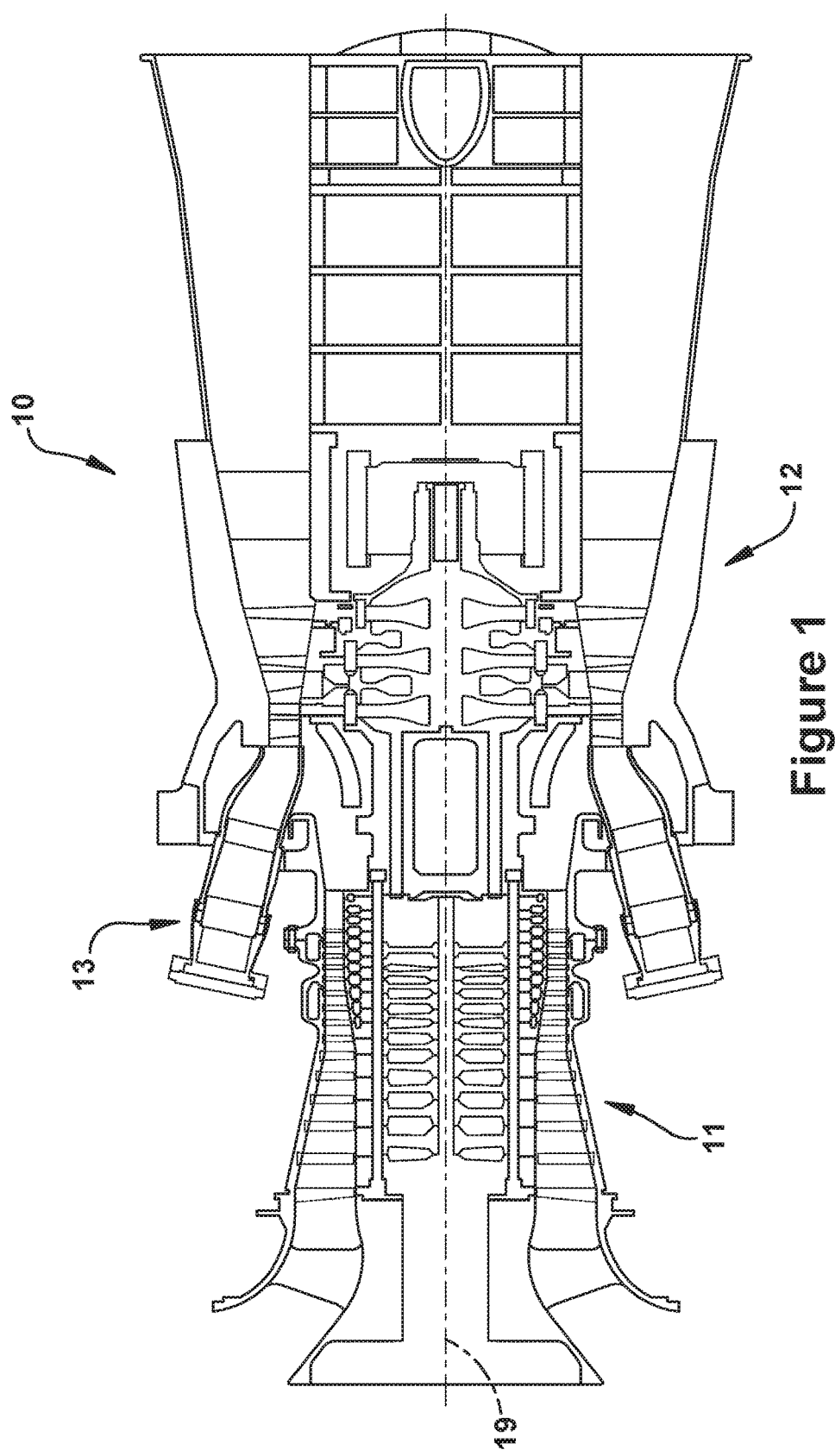
FIG. 1 is a schematic representation of an exemplary gas turbine with which embodiments of the present invention may be used.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciated that such terms often are subject to differing interpretations. For example, what may be referred to herein as a single component, may be referenced elsewhere as consisting of multiple components, or, what may be referenced herein as including multiple components, may be referred to elsewhere as being a single component. Thus, in understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims.

By way of background, referring now with specificity to the figures, FIG. 1 illustrates a combustion or gas turbine engine ("gas turbine" or "gas turbine 10") as an example of an industrial asset or machine that may be monitored by a variety of sensor that collect and transmit data to remote computer systems for analysis thereby. In general, the gas turbine 10 operates by extracting energy from a pressurized flow of hot gas produced by the combustion of fuel in a stream of compressed air. As illustrated in FIG. 1, the gas turbine 10 includes an axial compressor 11 that is mechanically coupled by a common shaft or rotor to a downstream turbine section or turbine 12, with a combustor 13 being positioned between the compressor 11 and the turbine 12. As illustrated in FIG. 1, the gas turbine may be formed about a common central axis 19. In one example of gas turbine operation, the rotation of compressor rotor blades within the axial compressor 11 compresses a flow of air. In the combustor 13, energy is released when the compressed air is mixed with a fuel and ignited. The resulting flow of hot gases or "working fluid" from the combustor 13 is then directed over rotor blades within the turbine, which induces the rotation of the blades about the shaft. In this way, the energy of the flow of working fluid is transformed into the mechanical energy of the rotating blades and, given the connection between the rotor blades and the shaft, the rotating shaft. The mechanical energy of the shaft then may be used to drive the rotation of the compressor rotor blades, such that the necessary supply of compressed air is produced, and, for example, a generator to produce electricity.

Figure 2:
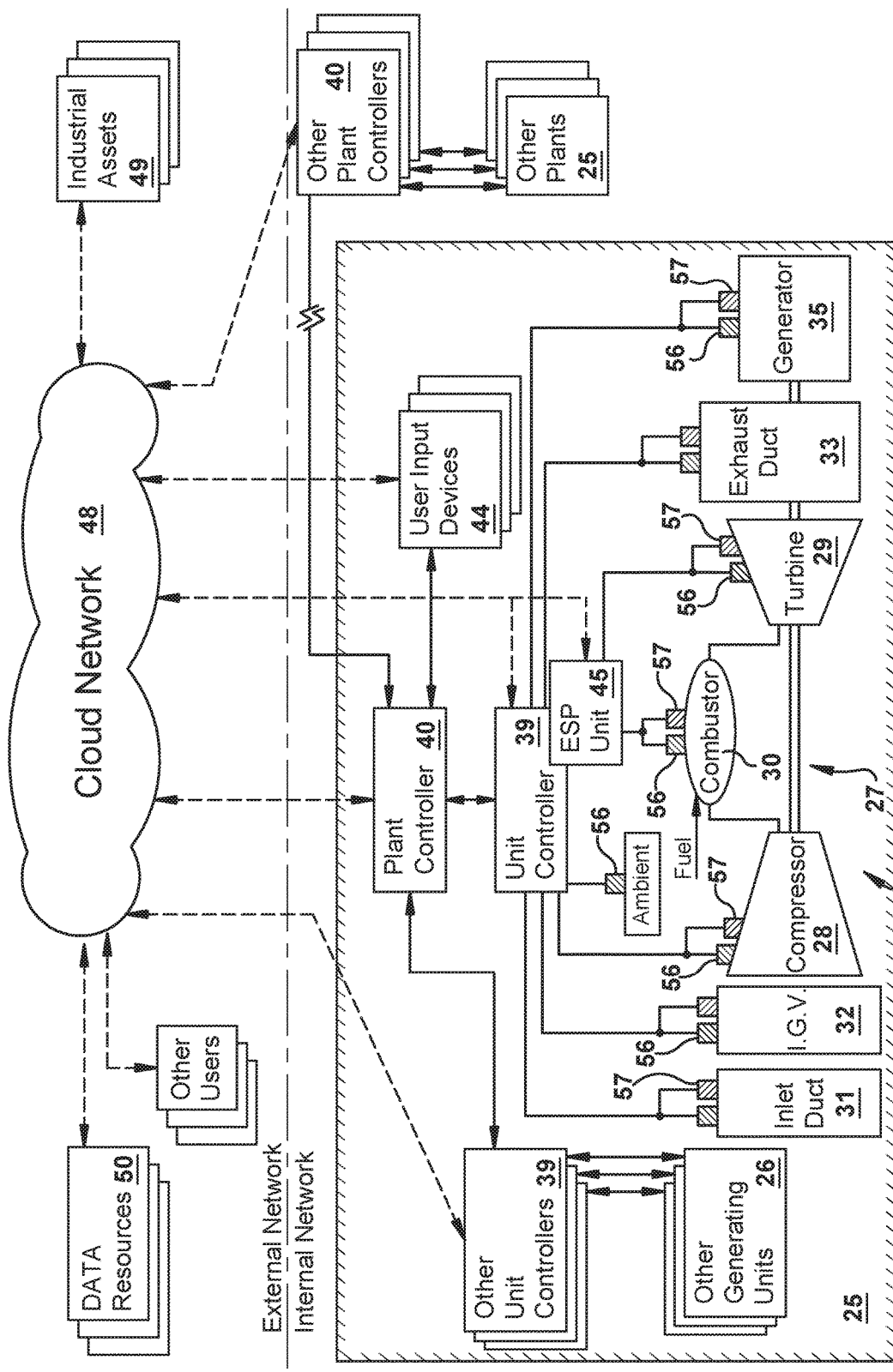
FIG. 2 illustrates a schematic diagram of an exemplary gas turbine with a control system and cloud network support in accordance with aspects and exemplary embodiments of the present invention.

FIG. 2 is a schematic diagram of an exemplary industrial asset, facility or power plant—herein "power plant" or "power plant 25". The power plant 25 may include any number of subsystems, components, or generating units—herein "generating units" or "generating units 26". In this case, for example, the generating unit 26 is a combustion or gas turbine engine or system—herein "gas turbine" or "gas turbine 27"—which may be similar to the engine introduced in FIG. 1. It should be understood that FIG. 2 is provided as an exemplary system by which operational data may be gathered within any generating units or other components that may be included within a power plant 25 and used for the management thereof. The various generating units, thus, may be connected to computer-implemented control systems and communication networks for the control and optimization of performance pursuant to analytics, processes, and other functionality described herein. For example, within such control systems, gathered operational data may be provided electronically to computer-implemented analytics, data repositories, plant or unit controllers, cloud-based services, and/or user input devices so to enable a variety of functions, for example, deriving control setpoints related to the operation of the generating unit, data storage/recall, generating user interfaces, prompting/obtaining user input, decision support for long-term and short-term operations, automated control responses, etc. As will be appreciated, such control systems may send/receive electronic communications to/from each of the systems, subsystems, components, sensors, actuators, and/or other equipment within the power plant 25 and/or generating unit 26, as well as manipulate control settings related thereto in a manner consistent with the functionality described herein.

Referring now with specificity to FIG. 2, the gas turbine 27 may include a combustion turbine engine that, in general, operates by extracting energy from a pressurized flow of hot gas produced by the combustion of fuel in a stream of compressed air. As shown, the gas turbine 27 may include an axial compressor 28 that is mechanically coupled by a common shaft to a downstream turbine section or turbine 29, with a combustor 30 being positioned therebetween. In one example of operation, the rotation of compressor rotor blades compress a flow of air within the compressor 28. Then, energy is released in the combustor 30 when the compressed airflow is mixed with a fuel and ignited. The resulting flow of hot gases or "working fluid" is then directed over rotor blades within the turbine 29, which induces the rotation of the shaft. In this way, the energy of the fuel is transformed into the mechanical energy of the rotating shaft, which then may be used to drive the rotation of the compressor rotor blades, so to produce the supply of compressed air, as well as turn the coils of a generator to produce electricity.

The gas turbine 27 may be part of a complex system that includes many other subsystems and components. For example, as further shown, the gas turbine 27 may include an inlet duct 31 that channels ambient air into the compressor 28. From there, the ingested air may flow through inlet guide vanes 32, which operate to desirably condition the flow of air as it enters the compressor 28. In addition, the gas turbine 27 may include an exhaust duct 33 that channels combustion gases from an outlet of the turbine 29 through, for example, emission control and sound absorbing devices. Finally, the gas turbine 27 may include a generator 35 that is operably connected to the common shaft of the gas turbine for converting the rotation thereof into electricity. Other subsystems and components also may be present.

The gas turbine 27 further may include a control system or controller, which will be referred to herein as a unit controller 39, that monitors and controls the operation of the engine. As an example, the unit controller 39 may be a Mark VI™ Turbine Control System from General Electric, which is designed to fulfill a variety of control requirements for such engines as well as protect against adverse or abnormal operating conditions. The unit controller 39, thus, may perform many functions, including fuel, air and emissions control, sequencing of turbine fuel for start-up, shut-down and cool-down, synchronization and voltage matching of the generator, monitoring of all gas turbine control and auxiliary functions, and protection against unsafe and adverse operating conditions, as well as other functionality which may be described or implied herein. As also shown, in cases where the gas turbine 27 is part of a larger power plant, the unit controller 39 may connect to a plant controller 40 that controls the operation of the power plant 25. As discussed more below, each of the unit controller 39 and plant controller 40 may include a computer system having digital processing resources or processing capabilities—herein also "processor" or "processors"—as well as machine-readable storage medium, data storage or memory capabilities—herein also "memory". Alternatively, the unit controller 39 and/or the plant controller 40 may be combined into a single controller having an integrated architecture. The unit controller 39, plant controller 40, and the computer system related to each—also referenced collectively herein as "controllers"—may connect to user interface or input devices—herein "user input devices" or "user input devices 44". Such connections, as illustrated, may be made either through internal or external networks. The user input devices 44 may be used to receive and send communications from/to any of the personnel associated with the operation of the power plant 25 or generating unit 26. It should be understood that such user input devices 44 may include any conventional computer-implemented device having a user interface, without limitation, including mobile devices and other workstations whether locally or remotely disposed relative to the location of the power plant 25 or generating unit 26. As also shown in FIG. 2, several other generating units 26 may be provided, each of which may include a unit controller 39 that connects to or is integrated with the plant controller 40. The plant controller 40 may further connect to other plant controllers 40 associated with the operation of other power plants 25.

As stated, each of the unit controller 39 and plant controller 40 may include a computer system. It should be understood that such computer systems may include one or more processors, memory, and other conventional computing components as may be required given any of the functionality described herein. As further anticipated by the present application, the computer systems related to the unit controller 39 and plant controller 40 may include non-local aspects distributed throughout the several other resources, nodes or devices depicted throughout FIG. 2, as will be described in more detail to follow. For example, these other nodes may include, without limitation: a communication network, cloud or cloud-based platform—herein "cloud network 48", or more generally "cloud"; data repositories or other informational resources—herein "data resources" or "data resources 50"; the several user input devices 44; and other linked unit controllers, plant controllers, and industrial assets 49. Therefore, it should be understood that the consolidated and localized depiction of the unit controller 39 and plant controller 40 in FIG. 2, as well as the computer systems, processors, and memory resources related to each, is merely exemplary and not meant to limit the manner in which any functionality described herein is performed or executed, unless otherwise expressly stated. Along these lines, it should be further appreciated that reference to the unit controller 39, the plant controller 40, and/or the computer systems associated with each may include computing resources, such as processing, storage, memory, data and communication devices, which are distributed and accessible via internal or power plant level networks as well as the cloud or cloud network 48, as would be understood by one of ordinary skill in the art given a distributed computing environment and the functionality described herein, whether that functionality be expressly stated or implied.

The gas turbine 27, as well as any of the other generating units 26, may include multiple sensors 56 that are configured to monitor particular operational aspects of the gas turbine 27 by detecting or measuring various operating conditions or parameters throughout the engine, including, for example, conditions within the compressor 28, turbine 29, combustor 30, generator 35, ambient environment, etc. For example, the sensors 56 may include temperature sensors that monitor ambient temperature, compressor discharge temperature, turbine exhaust temperature, and other temperatures along the working fluid flowpath through the gas turbine 27. The sensors 56 may further include acoustic or pressure sensors that monitor ambient pressure, static and dynamic pressure levels at the compressor inlet, compressor outlet, combustor, turbine exhaust, and at other suitable locations within the gas turbine 27. The sensors 56 also may include humidity sensors that measure ambient humidity in the inlet duct 31 of the compressor 28. The sensors 56 also may include flow sensors, velocity sensors, acceleration sensors, flame detector sensors, valve position sensors, guide vane angle sensors, as well as any other conventional sensor anticipated given the functionality described herein that may be used to measure various parameters and conditions relative to the operation of the gas turbine 27. As used herein, the term "parameter" refers to measurable physical properties of operation which collectively may be used to define operating conditions within a system, such as the gas turbine 27 or other system described herein. Such operating parameters may include those just described, including, without limitation, temperatures, pressures, humidity, and gas flow characteristics at locations defined along the path of the working fluid, as well as ambient conditions, fuel characteristics, and other measurables, as may be described or implied by any of the functionality described herein.

It will be appreciated that the gas turbine 27 also may include several actuators 57 by which control of the gas turbine 27 is achieved. For example, such actuators 57 may include electro-mechanical devices having variable set-points or settings that allow for the manipulation of certain process inputs—herein "manipulated variables"—for the control of process outputs—herein "controlled variables"—in accordance with a desired result or mode of operation. The control of the manipulated variables via the actuators 57 must take into account other non-controllable variables—herein "disturbance variables"—which also affect the operation of the gas turbine 27. Thus, for example, commands generated by the controller the unit controller 39 may cause one or more actuators 57 within the gas turbine 27 to adjust valves between a fuel supply and the combustor 30 to regulate flow level, fuel splits, or fuel type. As another example, commands generated by the unit controller 39 may cause one or more actuators 57 to adjust a setting that changes an angle of orientation of the inlet guide vanes 32 and thereby affects the manner in which air enters the compressor 28.

Thus, in accordance with exemplary embodiments, the computer systems of the unit controller 39 and/or plant controller 40 may execute code or software that is configured to control the gas turbine 27 and/or power plant 25 pursuant to a desired mode of operation. Such control may be responsive to operational data supplied by the sensors 56 as well as to instructions received from the user input devices 44, and such control may be implemented via manipulating one or more of the actuators 57. In furtherance of this, the user input devices 44 may be accessed and used by plant managers, technicians, engineers, operators, energy traders, owners, and/or any other stakeholder, as may be described or implied by any of the functionality provided herein. The software executed by the computer system may include scheduling algorithms for regulating any of the systems or subsystems described herein. For example, the software may enable the unit controller 39 to control the operation of the gas turbine 27 based, in part, on algorithms stored in the memory of the unit controller 39. These algorithms, for example, may maintain a firing temperature of the combustor to within predefined limits. It will be appreciated that algorithms may include inputs for parameter variables such as compressor pressure ratio, ambient humidity, inlet pressure loss, turbine exhaust backpressure, as well as any other suitable parameters. The software may include schedules and algorithms that accommodate variations in ambient conditions that affect emissions, combustor dynamics, firing temperature limits at full and part-load operating conditions, etc. As discussed in more detail below, the executed software may further apply algorithms for scheduling the gas turbine, such as those settings relating to desired turbine exhaust temperatures and combustor fuel splits, with the objective of satisfying performance objectives while complying with operability boundaries of the engine. For example, the computer system of the unit controller 39 may determine combustor temperature rise and NOx during part-load operation in order to increase the operating margin to the combustion dynamics boundary and thereby improve operability, reliability, and availability of the unit.

As further shown, the gas turbine 27 may include one or more event stream processing ("ESP") units 45. As discussed in more detail below, the ESP unit 45 may be configured as an "edge computing device" or "edge device" through which raw data from one or more of the sensors 47 is streamed before such data is aggregated, transformed, and/or materially processed for efficient ingestion and use by the unit controller 39. The ESP unit 45 may be integrated into the unit controller 39 or made a separate device, and, as discussed more below, may include one or more analytic units for detecting anomalies in an incoming stream of raw data. As will be appreciate, such analytic units or edge devices may be used to detect precursors that signal operational anomalies as well as enable particularly rapid control responses so that harmful anomalies may be avoided.

The computer systems of the unit controller 39, plant controller 40, and/or ESP unit 45 may be connected to the cloud or cloud network 48 and, via this connection, data, instructions, communications, software, and other information may be exchanged pursuant to the functionality described herein. The cloud network 48 further may include computational resources, data storage, analytics, platform services, and other resources and services pursuant to the functionality described herein. The cloud network 48 may include an external network that connects remote industrial assets or power plants, as well as a component level network (referred to in FIG. 2 as an "internal network") to other resources, such as other users, other industrial assets 49, and data resources 50. The connections made between the cloud network 48 and any of the other nodes or devices of FIG. 2 may be wired or wireless and/or inclusive of any conventional communication systems or devices. As will be appreciated, the cloud network 48 may be part of a larger communication system or network, including the Internet and/or one or more private computer networks, that has a distributed architecture. In this manner, the unit controller 39 and plant controller 40 may receive information, data, and instructions from and/or send information, data, and instructions to data resources 50. Connection to such data resources 50 may be made via the cloud network 48 or, alternatively, one or more of resources of the data resources 50 may be stored locally and be accessed outside of the cloud network 48 via a private or internal network. Additionally, as discussed more below, the cloud network 48 may connect the gas turbine 27 to other industrial assets 49, such as other remote gas turbines, power plants, or the facilities of suppliers or customers.

As used herein, the data resources 50 of FIG. 2 may include several types of data, including but not limited to: market data, operational data, and ambient data. Market data, for example, may include information on market conditions, such as energy sales price, fuel costs, labor costs, regulations, etc. Operational data, for example, may include information relating to the operating conditions of the power plant 25, the gas turbine 27 or related components. Such operational data may include temperature or pressure measurements, air flow rates, fuel flow rates, etc. within the gas turbine 27. Ambient data, for example, may include information related to ambient conditions at the power plant, such as ambient air temperature, humidity, and/or pressure. Market, operating, and ambient data each may include historical records, present condition data, and/or data relating to forecasts. For example, data resources 50 may include present and forecast meteorological/climate information, present and forecast market conditions, usage and performance history records about the operation of the power plant 25 or gas turbine 27, and/or measured parameters regarding the operation of other similarly situated power plants or gas turbines, which may be defined as those having similar components and/or configurations. Other data, as may be described or implied by the functionality described herein, also may be stored and recalled from data resources 50 as needed.

Thus, according to exemplary embodiments, it should be understood that, while each of the unit controller 39 and plant controller 40, as well as the ESP unit 45, may include computer systems having a processor, memory, databases, communication devices, and other computing resources, it should be appreciated that these resources may be distributed, for example, across any of the several nodes or devices depicted in FIG. 2, including the ESP unit 45, unit controller 39, plant controller 40, user input devices 44, cloud network 48, data resources 50, other industrial assets 49, etc. That is, while certain aspects the unit controller 39 and plant controller 40 may be locally disposed, other aspects may be remote and operationally connected via the cloud network 48, as indicated by the dotted lines of FIG. 2. As stated, the unit controller 39 and plant controller 40—also referenced collectively herein as "controllers"—may be connected to each piece of equipment, subsystem, or component within the power plant, including the gas turbine 27 and related subsystems, such that the sensors 56 deliver data to the controllers and the actuators 57 are responsive to commands received from the controllers. Unless otherwise stated, however, present systems and methods may include embodiments that are not configured to directly control the gas turbine or other generating unit and/or to directly measure operating conditions. In those presently described embodiments that do directly measure/control operation of the gas turbine or other generating unit, such control may be made pursuant to a "control program", which may be stored, in whole or in part, within the memory of the computer systems of the unit controller 39 and/or plant controller 40 and, when operated, makes the computer systems thereof manage data and perform the processes, analytics, and logic as provided herein.

According to an exemplary manner of operation, a processor of the computer systems of the controllers executes software or program code (herein "program code") that defines the control program. While executing the program code, the processor processes data, which results in reading and/or writing transformed data from/to memory. Displays on the user input devices 44 may enable a human user (also "operator"), such as any of those described herein, to interact with the computer system using a communications link, such as may be provided via the cloud network 48. As will be appreciated, the cloud network 48 may enable the computer system to communicate with any of the other devices described herein, regardless of location. To this extent, the control program of the present invention may manage a set of interfaces that enable several users to interact with the control program. Further, the control program, as discussed further below, may manage (e.g., store, retrieve, create, manipulate, organize, present, etc.) data, such as control data or operational data. The controllers may include one or more general purpose computing articles of manufacture capable of executing the program code of the control programs once it is installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, the program code may include object code, source code, and/or executable code, and may form part of a computer program product when on computer readable medium. It is understood that the term "computer readable medium" may comprise one or more of any type of tangible medium of expression, now known or later developed, from which a copy of the program code may be perceived, reproduced, or otherwise communicated by a computing device.

As will be appreciated, when the computer executes the program code, it becomes an apparatus for practicing the invention, and on a general-purpose microprocessor, specific logic circuits are created by configuration of the microprocessor with computer code segments. For example, a technical effect of the executable instructions may be to implement a control method and/or system and/or computer program product that uses models to enhance, augment or optimize operating characteristics of industrial assets to improve economic return given a set of constraints, such as ambient conditions, market conditions, performance parameters, life cycle costs, etc. In addition to using current information, historical and/or forecast information may be employed, and a feedback loop may be established to dynamically operate the generating unit and/or power plant more efficiently during fluctuating conditions. The computer code of the control program may be written in computer instructions executable by the computer systems of the controllers. To this extent, the control program executed by the controllers and/or other distributed computer resources may be embodied as any combination of system software and/or application software. Further, the control program may be implemented using a set of modules. In this case, a module may enable the controllers to perform a set of tasks used by control program, and may be separately developed and/or implemented apart from other portions of control program. As will be appreciated, when the computer system executing the control program includes multiple computing devices, such as previously described, each computing device may have only a portion of control program or program code fixed thereon.

Thus, generally, the control program may enable computing and digital resources—such as those specifically described herein or which may be generally referred to as a "computer system"—to implement a unit controller or plant controller in accordance with the functionality provided here, particularly those figures to follow that include data flow diagrams, algorithms, methods, analytics, and/or logic. For purposes herein, such a computer system may obtain data via any conventional means. For example, such a computer system may calculate control data for a generating unit or power plant, retrieve control data relating to a generating unit or power plant from one or more data stores, repositories or sources, and/or receive control data for a generating unit or power plant from other systems or devices in or outside of the locality of the generating unit or power plant. In other embodiments, the present application provides methods of providing a copy of the program code, such as for executing the control program, which may include the implementation of some or all the processes described herein. It should be further understood that aspects of the present invention may be implemented as part of a business method that performs a process described herein on a subscription or fee basis. For example, a service provider may implement the control program at a customer generating unit or power plant. In such cases, the service provider may manage the computer system or controllers that performs one or more of the processes described herein for the customer facility.

As will be appreciated, aspects of the innovations described herein relate to what is often referred to as the "Industrial Internet of Things" ("IIoT"). The IIoT generally refers to the use of industrial connectedness toward enhanced management of industrial assets, such as power plant and generating units introduced above. The IIoT connects industrial assets to the Internet or a cloud-based or "cloud" computing environment, such as the previously discussed cloud network of FIG. 2. In this manner, the IIoT links industrial assets to each other in meaningful ways—for example, carrying information therebetween and remotely to other cloud resources and user input devices—so that more effective ways to manage those industrial assets are enabled and realized. This is achieved by insights that would otherwise go unnoticed but for the interconnectedness fostered by the IIoT.

By way of a simplified example, the cloud may include a computing system having one or more processors, one or more databases, and a plurality of users and/or industrial assets that are in data communication through those computing systems, as well as one or more modules implemented via those computing systems that are configured to perform a specific task. Such tasks, for example, may relate to asset maintenance, performance analytics, data storage and transfer, security, and/or other functions as provided herein. Present systems and methods, thus, should be understood in this context, where, for example, cloud resources associated with the IIoT may be used to receive, relay, transmit, store, analyze, or otherwise process data and information for or about one or more connected industrial assets and users. It should be understood, however, that the integration of industrial assets with such remote computing resources toward the enablement of the IIoT remains technically challenging, often presenting technical hurdles separate and distinct from the specific industry involved and computer networking, generally. The Predix™ platform available from General Electric is one such cloud-based platform that includes systems and methods relating to the management of industrial assets. It should be understood that the Predix™ platform may serve as a component and/or enabler of any presently described embodiments that relate to the design, operation, and/or management of industrial assets within the IIoT, allowing users to bridge gaps between software and operations to enhance asset performance, optimize operations, foster innovation, and, ultimately, provide greater economic value. The Predix™ platform, for example, may serve as a component and/or enabler of aspects of the previously described cloud network 48 of FIG. 2 and the various digital, computing, and communication resources associated therewith, without limitation, and may be deployed in accordance with the functionality described herein.

With reference now to FIGS. 3 through 7, embodiments of the present invention are disclosed that include computer-implemented methods and systems for efficiently transmitting data originating from sensors that periodically measure operating parameters relating to the operation of an industrial asset or machine. As already discussed, such operating parameters may include any physical aspect related to the operation of the industrial machine. As used herein, for each of the measurements taken, the sensors are described as producing a "measured value" of the corresponding operating parameters such that, over a period of time, a time-series dataset is generated for the measured operating parameter. The data may be transmitted in discrete data packets, each of which includes at least one the measured values produced by the sensors. As further used herein, it should be understood that the transmitted measured values include at least the following information: the operating parameter measured; the value of the operating parameter as measured by the sensor; and the time of measurement or "measurement time" that the measurement was made by the sensor.

Figure 3:
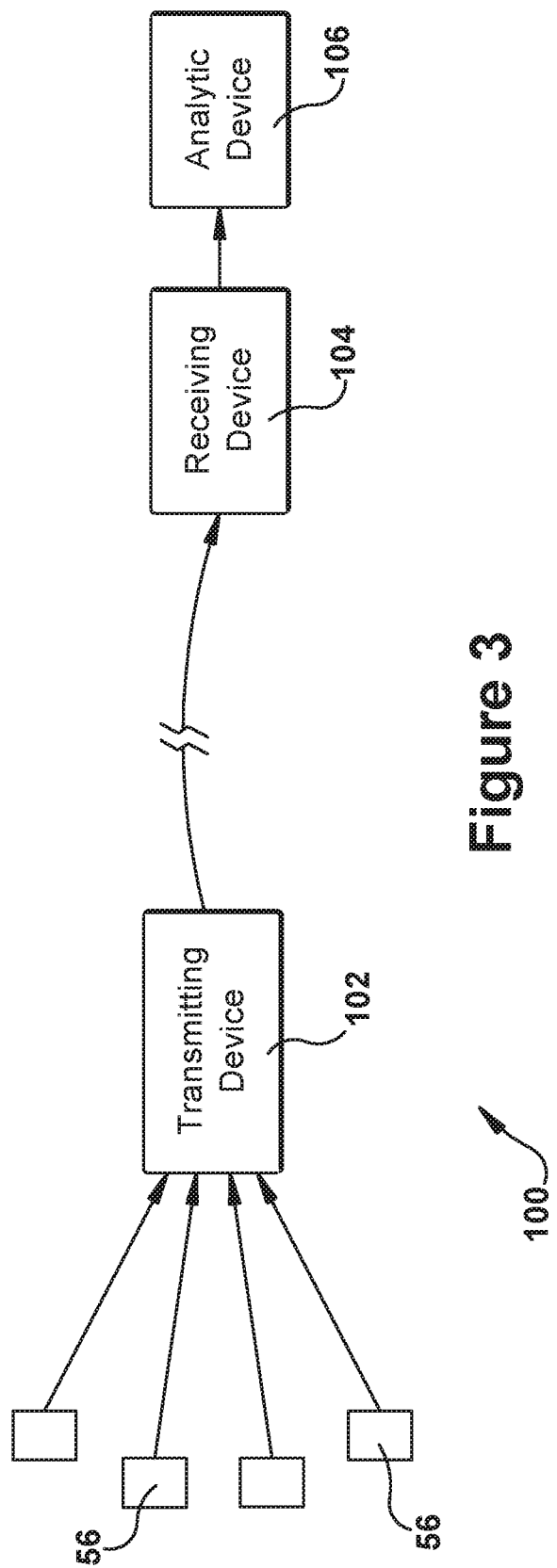
FIG. 3 schematically illustrates a data transmitting system in according with aspects of the present invention.

With specific reference now to FIG. 3, a schematically illustrated system 100 is shown for transmitting and receiving data in accordance with aspects of the present invention. As illustrated, the system 100 may include a transmitting device 102 that is communicatively linked to a plurality of sensors 56. As described more below, the transmitting device 102 may be configured to transmit the measured values generated by the sensors 56 within data packets in accordance with a transmitting process or protocol. The system 100 may further include a receiving device 104, which is configured to receives the measured values transmitted by the transmitting device 102. As described more below, the receiving device 104 may be configured to process the received measured values in accordance with a receiving process or protocol. The system may further include an analytic device 106 that is configured to receive and make calculations with a time-aligned set of parameter values that, as described below, may be derived from the measured values. The analytic device 106 may make such calculations in accordance with an analytic process or protocol. As discussed above in relation to FIG. 2, the transmitting device 102, the receiving device 104, and the analytic device 106 each may include one or more hardware processors and a machine-readable storage medium on which is stored instructions that cause the one or more hardware processors to execute the transmittal protocol, receiving protocol, and/or analytic protocol.

As will be appreciated, aspects of the present invention may enable the efficient transmission of measurement data produced by sensors to remotely located analytic engines for the timely validation and usage thereby. Thus, it is anticipated that the sensors 56 and the transmitting device 102 each may be disposed locally in relation to a location of the industrial machine, while the receiving device 104 and analytic device 106 are disposed remotely in relation to the industrial machine. The computing resources used by the processes discussed herein may be distributed across the various location of the devices 102, 104, 106. Thus, the hardware processor and the machine-readable storage medium may be distributed within one or more of the transmitting device 102, the receiving device 104, and the analytic device 106.

The analytic device 106 may be configured to receive and make a calculation according to the analytic protocol using the measured values of the operating parameters, which, as discussed more below, may be configured via the receiving protocol into a time-aligned set of parameter values. The calculation performed by the analytic protocol may include any useful calculation for the control, operation, or optimization of the industrial machine, for example, the time-aligned set of parameter values may be used to calculate a performance characteristic related to the operation of the industrial machine. The industrial machine may include any industrial machine, for example, the industrial machine may be a gas turbine, such as the one discussed in FIG. 1, a steam turbine, or combined-cycle plant that includes both a gas turbine and a steam turbine. According to exemplary embodiments, the transmitting device 102 may be an edge computing device or ESP unit 45, as described above in relation to FIG. 2.

Figure 4:
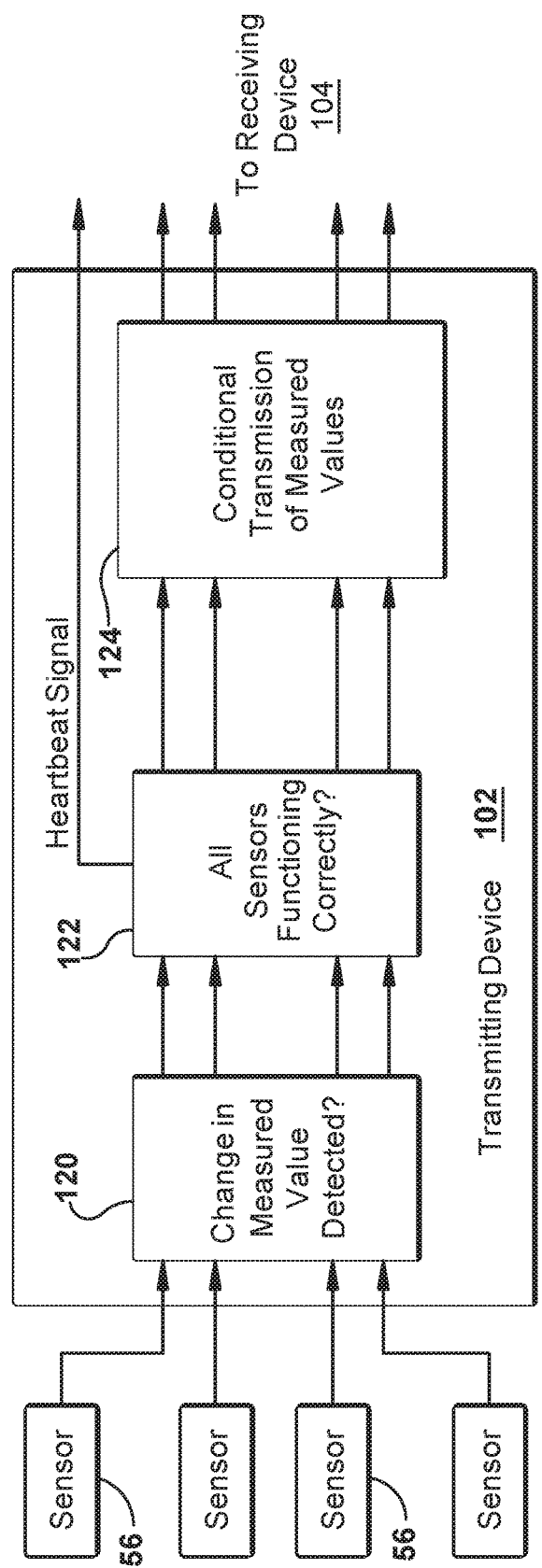
FIG. 4 illustrates an exemplary transmitting device according to embodiments of the present invention.

FIG. 4 illustrates a flow diagram of a transmittal protocol of the transmitting device 102 according to exemplary embodiments of the present invention. As shown, the transmitting device 102 may be communicatively linked with multiple sensors 56, while the transmittal protocol includes several functional blocks, each representing a particular analytic action. A first of these is a functional block 120, where it is determined for each of the sensors 56 whether a most current measured value represents a change in value or, as used herein, a "changed value" for the corresponding operating parameter. At a second functional block 122, the transmittal protocol periodically determines if each of the connected sensors 56 is functioning correctly. As discussed more below, based on this determination, the transmittal protocol includes conditionally transmitting a heartbeat signal on each occurrence that the sensors 56 are determined to be functioning correctly. Finally, at a third functional block 124, the transmittal protocol includes conditional transmitting the measured values for each of the sensors 56 if a changed value was detected in functional block 120.

More specifically, in accordance with a preferred embodiment, the transmittal protocol may include the transmitting device 102 applying the following steps to the measured values provided by the sensors 56 to the transmitting device 102 via the communication link therebetween. The transmittal protocol will be discussed in relation to one of the sensors 56, but it should be appreciated that the transmittal protocol may be applied to each of the sensors 56 connected to the transmitting device 102.

At an initial step, in accordance with a preferred embodiment, the transmittal protocol includes determining a most recent measured value of the particular sensor based on the relative measurement times of the measured values produced by that sensor. At a second step, the transmittal protocol includes selecting one or more previous measured values of the sensor 56. As used herein, the previous measured values are those having a measurement time occurring previous or immediately previous to the most recent measured value. A third step includes comparing the most recent measured value to the selected previous measured values to determine a difference therebetween. At a fourth step, the transmittal protocol includes conditionally transmitting the most recent measured value via a newly generated data packet, with the conditionality being based on the difference. According to preferred embodiments, the step of conditionally transmitting the most recent measured value may depend upon whether the difference exceeds a predetermined threshold. The predetermined threshold may be one that, when exceeded, indicates that the operating parameter being measured by the sensor has a changed value relative to the values that were measured previously. For example, the changed value may indicate a deviance from what was considered a steady state operating condition. According to exemplary embodiments, for the purposes of this process, the previous measured values may be selected as a predetermined number of successive measured values that occur just prior to the most recent measured value for that particular sensor 56. According to other embodiments, the previous measured values for the sensor 56 are selected as those having measurement times occurring within a predetermined sliding window of time that is defined relative to the measurement time of the most recent measured value of the sensor 56.

Figure 5:
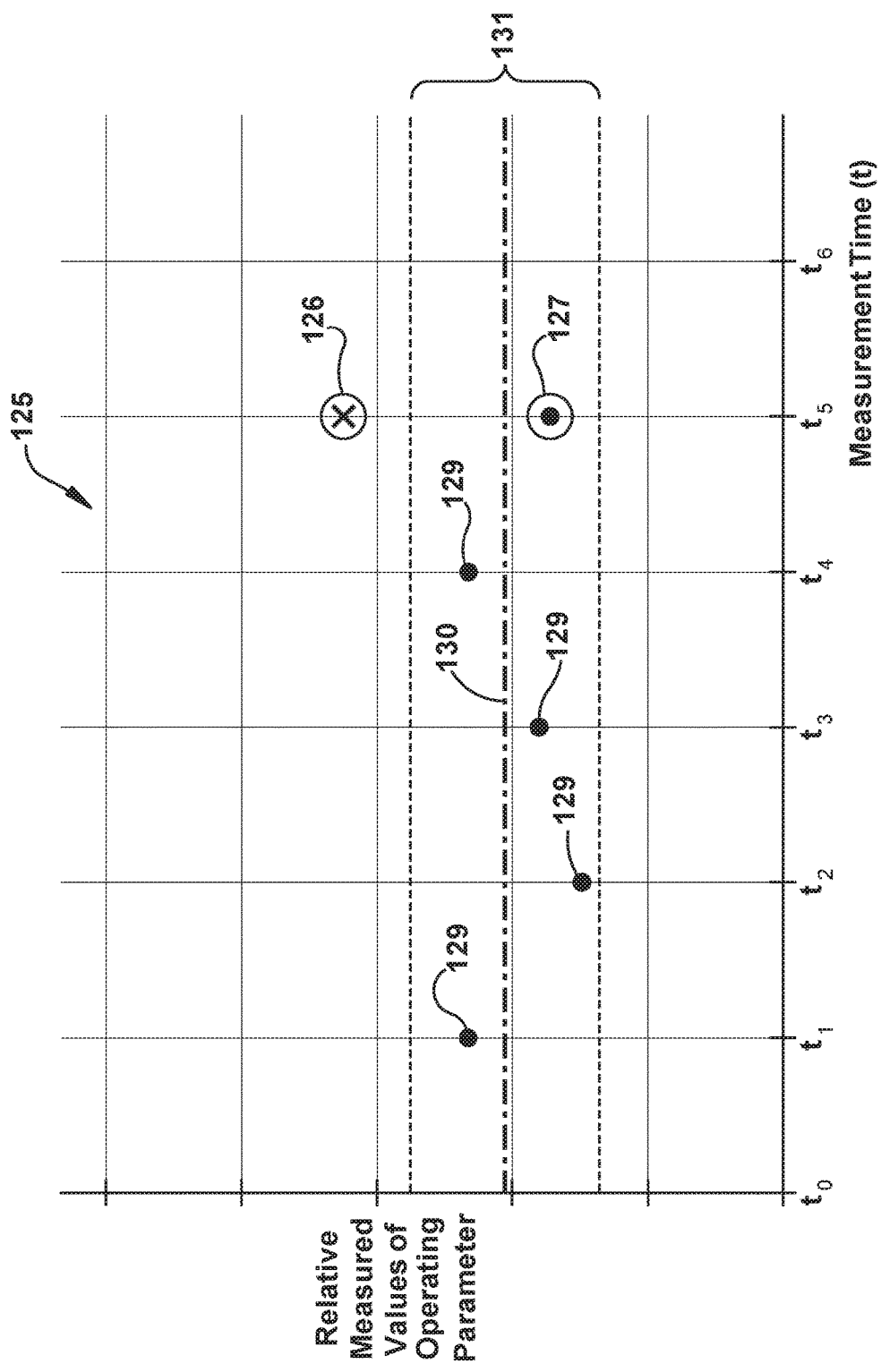
FIG. 5 illustrates a plot of time series data that demonstrates a transmittal protocol according to an exemplary embodiment of the present invention.

FIG. 5 illustrates an exemplary plot 125 of a time-series dataset that demonstrates the manner by which the transmittal protocol may function according to an exemplary embodiment. In this case, the step of comparing the most recent measured value (which for the purposes of the example are shown as alternative points 126 and 127) to a plurality of previous measured values (which are shown as points 129) to determine the difference is accomplished by: a) finding a median value (represented by dashed line 130) for the previous measured values 129; and then b) defining a range 131 (represented by distance between dashed lines) about the median value 130. The transmittal protocol then may determine whether the most recent measured value falls within this range 131 and base the conditional transmission of the most recent measured value on whether it does. That is, the transmittal protocol may include logic that requires the transmission of the most recent measured value when it falls outside of the range 131, while preventing the transmission of the most recent measured value when it falls inside of the range 131.

To illustrate this, two alternate values are given in FIG. 5 for the most recent measured value: a first value and second value identified by the reference numerals 126 and 127, respectively. In the case of the first value 126, which falls outside of the defined range 131, the logic of the transmittal protocol will require the transmission of the value. Specifically, because the most current value of the measured operating parameter is found to have sufficiently changed relative the previous measured values, the transmittal protocol will require that it be transmitted by the transmitting device 102 to the receiving device 104. On the other hand, in the alternative case of the second value 127, which falls inside of the defined range 131, the logic of the transmittal protocol will prevent the transmission of this measured value. That is, in this case, because the most current value for the measured operating parameter is judged to have not sufficiently changed, the transmittal of it to the receiving device 104 is prevented. In this manner, as discussed more below, the number of necessary transmission may be advantageously reduced for the system 100. This reduction in the amount of transmitted data is accomplished without negatively impact the completeness of the data that ultimately is provided to the analytic device 106. This is because the receiving protocol includes functionality that, when used in conjunction with the heartbeat signals that communicates a functional status of the sensors 56, anticipates these "non-transmitted measured values". As will be seen, this may enable the accurate estimation of both the value and measurement time for such non-transmitted measured values so that these measured values are recreated by the receiving device 104 and passed along to the analytic device 106.

Figure 6:
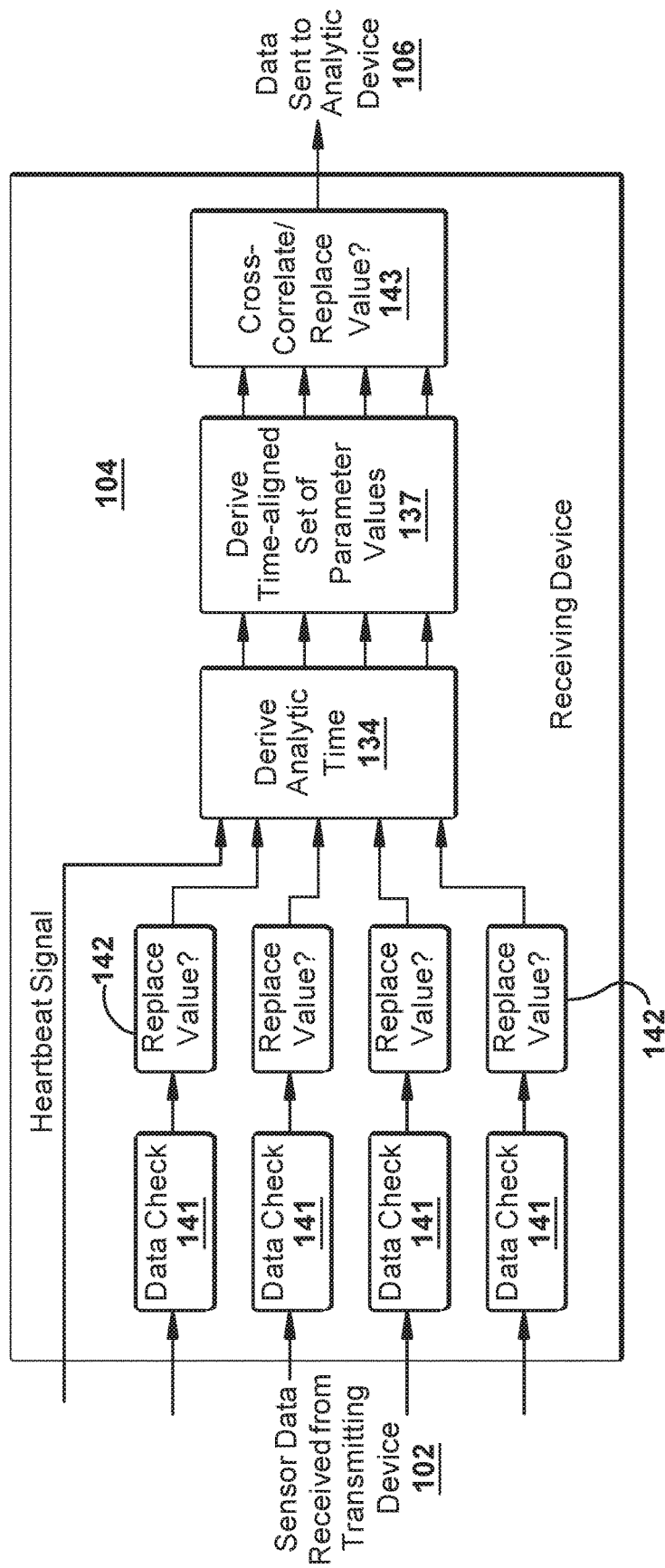
FIG. 6 illustrates an exemplary receiving device of a data transmitting system according to embodiments of the present invention.

FIG. 6 illustrate a flow diagram for the receiving protocol of the receiving device 104 according to exemplary embodiments of the present invention. As will be appreciated, the receiving protocol includes processes by which the measured values of the operating parameters are received by the receiving device 104 and then validated, processed, and/or time-aligned so that these values may be transferred to the analytic device 106 for use in calculations. It should be understood that, as used herein, once the measured values are received at the receiving device 104, they will be referred to as "received measured values" in order to differentiate from the "measured values" term that is used in describing measured values within the transmitting device 102.

According to exemplary embodiments, the receiving protocol, as represented by functional block 135, includes a step of deriving what will be referred to herein as an "analytic time". As will be seen, the "analytic time" refers to a distinct moment of operation for the industrial machine, which is designated based on the timeliness and accuracy of the data available for that moment. The analytic time, thus, is dependent on the timing of the latest or, as used herein, the "most current received measured value" for each of the operating parameters measured by the sensors 56. As will be seen, once the analytic time is determined, the time-aligned set of parameter values may be created by "time-aligning", as required, any of the measured values pursuant to the derived analytic time, which may include deriving estimated values for those operating parameters that do not have a measured value that coincides in time with the analytic time. Once derived, the time-aligned set of parameter values then may be made available to the analytic device, which may use this dataset in calculations or analytics relating to controlling the operation of the industrial machine. Given the need of such analytics for the most current data, the derivation of the analytic time generally includes optimally reducing the latency between the analytic time and a current time, without the sacrificing the accuracy of the data. In this manner, the distinct moment of operation represented in the time-aligned dataset may be both current and accurate.

In order to achieve this, the receiving protocol may include a step where the most recent received measured value for each of operating parameters measured by the sensors 56. As will be appreciated, the most recent received measured value may be may be based on the relative measurement times for the received measured values that arrive at the receiving device 104. Then, according to an exemplary embodiment, the analytic time is based on the measurement time associated with an oldest measurement time selected from the most recent received measured values for the sensors 56. That is, a group that includes the most recent received measured value for each of the sensors 56 may be populated and, from that group, the oldest measurement time is determined, which is then designated as the analytic time. Other methods for determining the analytic time are also possible, as discussed below in relation to FIG. 7.

Now that the analytic time is known, the receiving protocol may include a functional block 137 at which the time-aligned set of parameter values is determined. As used herein, the time-aligned set of parameter values is a set of values for the each of the operating parameters at the analytic time. As will be appreciated, it is often the case that the various periodic measurements made by the sensors 56 are at varying schedules such that the measurements do not regularly coincide at particular moments. However, the analytics that calculate or model performance characteristics of the industrial machine may produce better results when the datasets are made to accurately represent particular and distinct operational moments. Thus, it may be necessary to "time-align" the measured values for some of the operating parameters toward a particular moment, which, as used herein, is referred to as the analytic time. As a result, the time-aligned set of parameter values generally includes some actual measured values (i.e., for those operating parameters having measured values that actually coincide with the derived analytic time) as well as some time-aligned values that are imputed or estimated values of the operating parameter at the analytic time (i.e., for those operating parameters that do not have a measured value that coincides with the derived analytic time).

According to certain preferred embodiments, an exemplary process of deriving the time-aligned set of parameter values may begin by categorizing the sensors 56 into two categories based on respective measurement times of the most recent received measured values. These two categories may include: a first category for each of the sensors 56 for which the measurement time of the most recent received measured value coincides with the analytic time; and a second category for each of the sensors 56 for which the measurement time of the most recent received measured value does not coincide with the analytic time. The process then may derive time-aligned values by mathematically estimating an imputed value for each of the operating parameters relating to the sensors 56 of the second category. The time-aligned set of parameter values then includes: each of the received measured values for those operating parameters relating to sensors 56 in the first category; and each of the imputed values derived for the operating parameters relating to the sensors 56 in the second category.

Thus, the step of deriving the time-aligned set of parameter values may include deriving an imputed value for at least one of the operating parameters at the analytic time. The imputed value generally may be calculated via mathematical estimation techniques. That is, the imputed value may be based on other received measured values for the particular operating parameter that occur relatively close in time to the analytic time. According to preferred embodiments, the other received measured values used in this estimation may include: a first received measured value that has a measurement time occurring before or just prior to the analytic time; and a second received measured value having a measurement time occurring after or just subsequent to the analytic time. In such cases, according to preferred embodiments, the imputed value may be found by using these two received measured values to linearly interpolate an estimated value for the operating parameter at the analytic time. Once the derivation of the time-aligned set of parameter values is completed, the receiving protocol may include transferring it to the analytic device 106 for use in calculations defined by the analytic protocol.

As further shown in FIG. 6, the receiving device 104 may also be configured to validate the received measured values from each of the sensors 56 pursuant to a data validation protocol. As before, instructions may be stored on the machine-readable storage medium associated with the system 100 that cause the one or more hardware processors of the system 100 to execute, via the receiving device 104, the data validation protocol. According to exemplary embodiments, the data validation protocol may include one or both of: a per sensor validation protocol; and a cross-correlation validation protocol, each of which will now be discussed.

In regard to the per sensor validation protocol, as indicated by functional blocks 141, the receiving device 104 may execute an initial check by which the most recent received measured value for each of the sensors 56 is validated via a statistical comparison to previously received measured values for the particular sensor 56. For example, the check may include a statistically analysis, such as standard deviation, that compares a value of the most recent received measured value against a plurality of previous received measured values to determine if the most recent received measured value indicates an anomalous reading or event. At functional block 142, the per sensor validation protocol may include conditionally calculating a replacement value for the most recent received measured value based on whether the statistical analysis indicates the occurrence of the anomalous event. For example, the replacement value may be calculated based on previous received measured values, such as by linear extrapolation and/or any other appropriate mathematical estimation techniques.

In regard to the cross-correlation validation protocol, as indicated by functional block 143, the received measured values for each of the sensors 56 are cross-correlated against corresponding received measured values for the other sensors 56. According to exemplary embodiments, this is accomplished via the use of a model of the industrial machine, such as a physics-based model, empirical model, or a combination thereof. As will be seen, the model is used to calculate a modeled value that corresponds to one of the received measured values of a selected operating parameter.

The received measured values for the other operating parameters may be used as inputs to the model. The modeled value may then be compared to the received measured value of the selected operating parameter to determine a difference therebetween.

More specifically, according to one example of operation, the cross-correlation validation protocol may be used to validate the values of the operating parameters within a time-aligned set of parameter values. In such cases, one of the operating parameters is selected from the time-aligned set of parameter values and designated as a "selected operating parameter", while the remaining group of non-selected operating parameters are designated as a "remainder group of operating parameters". The cross-correlation validation protocol then may calculate a modeled value for the selected operating parameter given, as inputs to the model, the values of the remainder group of operating parameters. That is, the model of the industrial machine is used to predict the modeled value for the selected operating parameter given operation that is modeled using the values of the operating parameters in the remainder group as inputs. The cross-correlation validation protocol then may proceed to compare the modeled value against the original value of the selected operating parameter in the time-aligned set of parameter values. This comparison may be done in order to determine a difference between the two values. The extent of this difference may then be used to determine if an anomaly is likely present. As will be appreciated, the cross-correlation validation protocol may be repeated until each of the operating parameters within the time-aligned set of parameter values is cross-correlated against the others. Thus, the cross-correlation validation protocol may continue until each of the operating parameters is selected to serve as the selected operating parameter. Based on the extent of the difference between the modeled value and the original value of selected operating parameter, the cross-correlation validation protocol may determine whether the value of the selected operating parameter in the time-aligned set of parameter values should be replaced. That is, the cross-correlation validation protocol may include conditionally replacing the value of the selected operating parameter in the time-aligned set of parameter values with a replacement value based on the calculated difference. According to certain preferred embodiments, the replacement value of the selected operating parameter is derived from or determined to be the same as the modeled value that was previously calculated for that particular operating parameter.

As previously stated, the transmittal protocol may include the transmitting device 102 conditionally transmitting a periodic heartbeat signal. The conditional transmission of the heartbeat signal may be based on a determination as to whether each of the sensors 56 is functioning correctly. Specifically, the transmitting device 102 may include functionality that periodically determines whether the sensors are functioning correctly and then: 1) transmit the heartbeat signal upon determining the sensors 56 are functioning correctly; or 2) decline to transmit the heartbeat signal if the sensors 56 are determined to not be functioning correctly. As will be appreciated, when functionality of this type of heartbeat signal is combined with the "changed value" rule of the transmittal protocol—i.e., the rule regarding transmitting the most recent measured values only upon the detection of an appreciable change in value—the amount of data that the system 100 is required to transmit may be reduced without sacrificing the completeness of the data for analytic purposes.

According to preferred embodiments, when the receiving protocol determines the most recent received measured value for each of the sensors 56, the receiving protocol may take into account whether the timing of any heartbeat signals indicates that a measured value relating to one of the measured operating parameters was not transmitted, which will be referred to as a "non-transmitted measured value". In doing this, the receiving protocol may include the step of determining whether a heartbeat signal was received after a most recent received measured value for one of the operating parameters. If this is the case, the duration of the lag ("lag duration") occurring between the two events may be used to infer conclusively that a measured value for that particular operating parameter was not transmitted because the measured value did not represent a "changed value" per the transmitting protocol. Thus, in cases where the lag duration is found to be indicative of this, the receiving protocol determines that there is a non-transmitted measured value for the particular operating parameter. As used herein, a non-transmitted measured value is a measured value that is not transmitted due to the conditional transmission rule of the transmittal protocol requiring a change in value. Having determined the existence of a non-transmitted measured value, the receiving protocol may then derive the value and measurement time for it, and, using these values, essentially recreate at the receiving device 104 the non-transmitted measured value. This "recreated measured value" then may be used by the receiving device and/or the receiving protocol in the same way as the any other of the received measured values. For example, the recreated measured value from the sensor 56 may be used with the other most recent received measured for the other sensors 56 to derive the analytic time.

The receiving protocol further may include a process by which the value and measurement time for the recreated measured value are derived or estimated in manner so that a close representation of the non-transmitted measured values is achieved. According to exemplary embodiments, the recreated measured value may be given a value based on the last received measured value from the particular sensor. More specifically, the value may be assumed to be approximately equal to or the same as the last received measured value from that particular sensor 56. As will be appreciated, this given value will be approximately equal to the value of the non-transmitted measured value because, given the functionality of the transmittal protocol, the reason the transmitting device did not to transmit it was because a change in value was not found to be present between the two data points. Further, the recreated measured value may be given a measurement time based on the time of transmission of the most recent heartbeat signal. According to other methods, the measurement time may be based on the most recent received measured value for the sensor 56 and a known frequency at which the sensor 56 periodically takes measurements.

Figure 7:
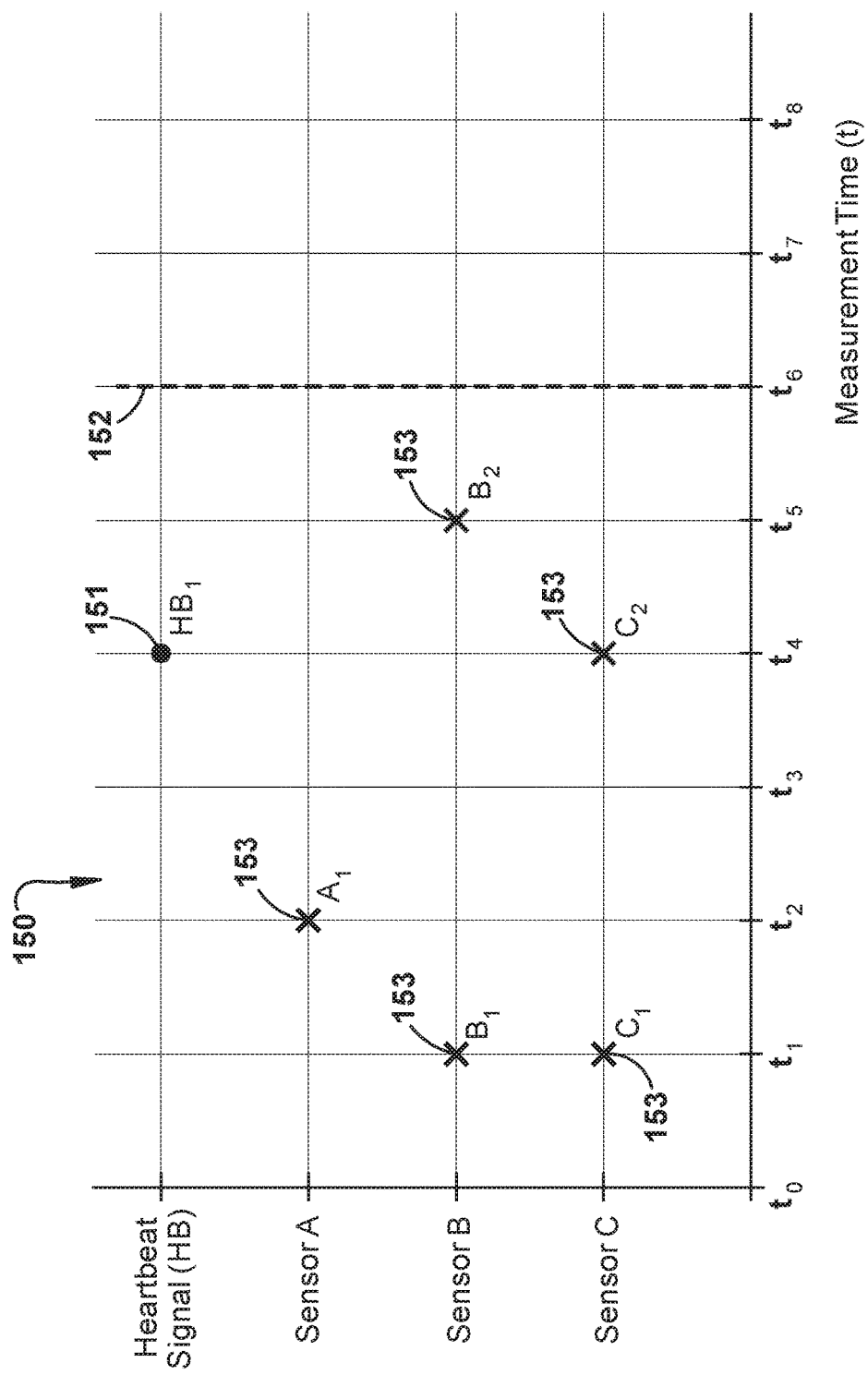
FIG. 7 illustrates a plot of time-series data that demonstrates the functioning of a receiving protocol according to an exemplary embodiment of the present invention.

With specific reference now to FIG. 7, an exemplary plot 150 of time-series data of received measured values is provided for illustrating the manner by which the receiving protocol derives the analytic time. As will be appreciated, the plot 150 shows the measurement times for several received measured values from a group of sensors: sensors A, B, & C. The plot 150 also shows a received heartbeat signal 151, which occurs as time $t_4$, as well as an indication of the current time, which is represented by the dashed line 152 at time $t_6$. In general, the object of deriving the analytic time is to optimally reduce the latency or duration of time between the analytic time and the current time 152. This is done so that the analytic time is as current as possible, which allows the analytics using the time-aligned set of parameter values to be as current and accurate as possible. Since these analytics are used to calculate performance characteristics and control the operation of the industrial machine, this is a significant consideration. Of course, there is a competing consideration regarding the need to maintain the accuracy of the data, which means that, in determining the analytic time, it is preferable to have actual measured values for the operating parameters over ones that are estimated or imputed.

Thus, at an initial step, the receiving protocol determines a most recent received measured value for each of received measured values 153 from sensors A, B, & C. Given the received measured values 153 as depicted in the plot 150 (and ignoring for the moment the heartbeat signal 151), the most recent received measured values are those that occur closest to the current time 152, which: for sensor A is the measured value $A_1$ occurring at time $t_2$; for sensor B is the measured value $B_2$ occurring at time $t_5$; and for sensor C is the measured value $C_2$ occurring at time $t_4$.

Now, still ignoring the impact of the heartbeat signal, the determination of the analytic time is straight-forward. As stated, according to one method of determining, the analytic time is based on the oldest of the most recent received measured values for each of the sensors. Thus, the analytic time is designated at time $t_2$ because the oldest of the most recent received measured values is associated with sensor A and occurs at time $t_2$. To continue this example, now that the analytic time is derived, the receiving protocol may derive the time-aligned set of parameter values. As already described, the time-aligned set of parameter values includes values for each of the operating parameters at the analytic time. As will be appreciated, the value for sensor A for the time-aligned set of parameter values will be the measured value $A_1$, which is due to the fact that this measured value coincides with the analytic time. However, because sensors B and C do not have measured values coinciding with the analytic time, the receiving protocol may calculate an imputed value for each sensor at the analytic time. Thus, according to preferred embodiments, the values and measurement times of the measured values $B_1$ and $B_2$ may be used to linearly interpolate an estimated value for the imputed value for the operating parameter of sensor B at the analytic time of time $t_2$. The same may also be done to impute a value for sensor C at the analytic time of time $t_2$.

The receiving protocol may operate somewhat different when the heartbeat signal is taken into effect, which will now be discussed. Because the heartbeat signal is a signal that indicates to the receiving protocol that all the sensors are functioning at time $t_4$, the receiving protocol may function to assume that a second measured value from sensor A was not transmitted because the measured value of the corresponding operating parameter was the same or approximately the same as the measured value $A_1$. This non-transmitted measured value then may be recreated by the receiving protocol at the receiving device 104 using a derived or imputed value and measurement time. Specifically, the recreated measured value may be assumed to have a value that is the same or approximately the same as the previous received measured value for sensor A (i.e., measured value $A_1$), while the measurement time may be based on the timing of the heartbeat signal occurring at time $t_4$ and/or a known timing of measurement from sensor A. This recreated measured value for sensor A then may be used just as any other received measured values to determine the analytic time and, from that, the time-aligned set of parameter values.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all the possible iterations is not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

The invention claimed is:

1. A system for transmitting data originating from sensors that periodically measure respective operating parameters for generating respective measured values thereof, wherein the operating parameters describe respective physical aspects of an operation of an industrial machine, and wherein the data is transmitted in discrete data packets that each comprises at least one of the measured values, the system comprising:

a transmitting device communicatively linked to each of the sensors, wherein the transmitting device is configured to transmit the measured values within the data packets in accordance with a transmittal protocol;

a receiving device that receives the measured values transmitted within the data packets from the transmitting device, wherein the receiving device processes the received measured values in accordance with a receiving protocol;

one or more hardware processors; and a machine-readable storage medium on which is stored instructions that cause the one or more hardware processors to execute the transmittal protocol and the receiving protocol;

wherein the measured values each comprises at least the following information: the operating parameter that was measured; a value of the measurement; and a measurement time indicating a time when the measurement was made;

wherein the transmittal protocol comprises the transmitting device applying the following steps to the measured values of the operating parameters provided to the transmitting device by each of the sensors, as exemplified with reference to a first sensor of the sensors:

determining a most recent measured value for the first sensor;

selecting previous measured values for the first sensor, the previous measured values each comprising ones of the measured values that occur previous to the most recent measured value based on the respective measurement times;

comparing the most recent measured value to the previous measured values to determine a difference therebetween; and conditionally transmitting the most recent measured value based on the difference;

wherein the receiving protocol comprises the steps of:
   determining a most recent received measured value for each of the sensors;
   deriving an analytic time based the most recent received measured values for each of the sensors; and
   deriving a time-aligned value for at least one of the operating parameters measured by the sensors at the analytic time.

2. The system according to claim 1, wherein the step of deriving an analytic time comprises:
   formulating a group with the most recent received measured values for each of the sensors;
   selecting from the group an oldest of the most recent received measured values based on the measurement time for each; and
   designating the measurement time of the oldest of the most recent received measured values as the analytic time;
   wherein the receiving protocol further comprises the step of deriving a time-aligned set of parameter values, the time-aligned set of parameter values comprising a value for each of the operating parameters at the analytic time.

3. The system according to claim 2, further comprising an analytic device configured to receive and make a calculation with the time-aligned set of parameter values according to an analytic protocol;
   wherein the receiving protocol further comprises the step of transferring the time-aligned set of parameter values to the analytic device; and
   wherein the machine-readable storage medium comprises stored instructions that cause the one or more hardware processors to execute the analytic protocol.

4. The system according to claim 3, wherein the calculation of the analytic protocol comprises using the time-aligned set of parameter values to calculate a performance characteristic related to the operation of the industrial machine;
   wherein the industrial machine comprises one of: a gas turbine; a steam turbine; and a combined-cycle plant that includes both a gas turbine and a steam turbine; and
   wherein the transmitting device comprises an edge computing device.

5. The system according to claim 3, wherein the sensors and the transmitting device are each disposed locally in relation to a location of the industrial machine;
   wherein the receiving device and the analytic device are each disposed remotely in relation to the location of the industrial machine; and
   wherein the hardware processor and the machine-readable storage medium are each distributed within one or more devices, including: the transmitting device; the receiving device; and the analytic device.

6. The system according to claim 3, wherein the step of the deriving the time-aligned value for the at least one operating parameter includes: deriving an imputed value for the at least one of the operating parameters at the analytic time that comprises a mathematical estimation based on at least two of the received measured values of the at least one of the operating parameters, wherein:
   the measurement time of a first of the at least two of the received measured values occurs before the analytic time; and
   the measurement time of a second of the at least two of the received measured values occurs after the analytic time.

7. The system according to claim 6, wherein the step of deriving the time-aligned set of parameter values includes:
   based on the analytic time, categorizing at least one of the sensors into each of two categories, including:
      a first category for each of the sensors for which the measurement time of the most recent received measured value coincides with the analytic time; and
      a second category for each of the sensors for which the measurement time of the most recent received measured value does not coincide with the analytic time;
   deriving the time-aligned value for each of the operating parameters relating to the sensors of the second category; and
   determining that the time-aligned set of parameter values for the analytic time includes:
      the received measured value that coincides with the analytic time for each of the operating parameter relating to the sensors of the first category; and
      the imputed value for each of the operating parameters relating to the sensors of the second category.

8. The system according to claim 7, wherein the step of deriving the time-aligned value for each of the operating sensors relating to the sensors of the second category comprises:
   deriving an imputed value by linear interpolation based on at least two of the received measured values of the operating parameter, wherein:
      the measurement time of a first of the at least two of the received measured values occurs before the analytic time; and
      the measurement time of a second of the at least two of the received measured values occurs after the analytic time.

9. The system according to claim 7, wherein the conditionally transmitting the most recent measured value for each of the operating parameters is based on whether the difference exceeds a threshold indicating a changed value for the first sensor; and
   wherein the previous measured values for the first sensor are selected as at least one of the following:
      a predetermined number of successive ones of the measured values occurring just prior to the most recent measured value of the first sensor; and
      ones of the measured values of the first sensor that occur within a sliding window of time defined relative to the measurement time of the most recent measured value of the first sensor.

10. The system according to claim 9, wherein the transmittal protocol further includes the steps of:
   periodically determining whether each of the sensors is currently functioning correctly; and
   conditionally transmitting a heartbeat signal each time that each of the sensors are determined to be currently functioning correctly.

11. The system according to claim 10, wherein the step of determining the most recent received measured value for each of the sensors includes:
   determining whether a most recent received heartbeat signal was received after the most recent received measured value and, if so, determining a lag duration that occurred therebetween;
   in cases where the most recent received heartbeat signal was received after the most recent received measured value, determining, based on the lag duration, that a non-transmitted measured value has occurred, the non-transmitted measured value comprising a one of the measured values that is not transmitted due to the transmittal protocol requiring the changed value for transmission; and creating a recreated measured value at the receiving device that represents for the purposes of the receiving protocol the non-transmitted measured value.

12. The system according to claim 11, wherein the step of creating the recreated measured value comprises deriving a measurement time and a value for the recreated measured value;

wherein the deriving the measurement time for the recreated measured value is based on the most recent received heartbeat signal; and wherein the deriving the value of the recreated measured value comprises making the value equal to a last received measured value for the first sensor.

13. The system according to claim 7, wherein the step of comparing the most recent measured value to the previous measured values to determine the difference therebetween is accomplished by:

determining a median value of the previous measured values;

defining a range about the median value; and determining whether the most recent measured value falls inside the range;

wherein the step of conditionally transmitting the most recent measured value further includes the steps of:

transmitting the most recent measured value if the most recent measured value is determined to fall outside of the range; and not transmitting the most recent measured value if the most recent measured value is determined to fall inside of the range.

14. The system according to claim 3, wherein the receiving device is further configured to validate the measured values received from each of the sensors according to a data validation protocol;

wherein the machine-readable storage medium comprises stored instructions that cause the one or more hardware processors to execute the data validation protocol; and wherein the data validation protocol comprises at least one of:

a per sensor validation protocol in which, for each of the sensors, the most recent received measured value is statistically analyzed against a plurality of the previous received measured values; and a cross-correlation validation protocol in which the most recent received measured values for each of the sensors are cross-correlated against each other.

15. The system according to claim 14, wherein the per sensor validation protocol comprises the step of conditionally calculating a replacement value for the most recent received measured value based on the statistical analysis indicating the most recent received measured value comprises an anomaly event.

16. The system according to claim 14, wherein the cross-correlation validation protocol comprises a model of the industrial machine; and wherein the cross-correlation validation protocol comprises the steps of:

selecting a selected operating parameter from the operating parameters of the time-aligned set of parameter values;

grouping non-selected operating parameters from the operating parameters of the time-aligned set of parameter values into a remainder group of the operating parameters;

calculating a modeled value for the selected operating parameter using the measured values of the remainder group of the operating parameters as inputs to the model.

17. The system according to claim 16, wherein the cross-correlation validation protocol further comprises the steps of:

comparing the measured value against the modeled value of the selected operating parameter to determine a difference therebetween; and based on the difference determined between the measured value and the modeled value of the subject operating parameter, conditionally replacing the measured value of the selected operating parameter in the time-aligned set of parameter values with a replacement value;

wherein the replacement value subject of the subject operating parameter comprises the modeled value of the subject operating parameter.

18. The system according to claim 17, wherein the model comprises a physics-based model; and wherein the data validation protocol comprises each of the per sensor validation protocol and the cross-correlation validation protocol.

19. A computer-implemented method for transmitting data originating from sensors that periodically measure respective operating parameters for generating respective measured values thereof, wherein the operating parameters describe respective physical aspects of an operation of an industrial machine, and wherein the data is transmitted in discrete data packets that each comprises at least one of the measured values, wherein the measured values each comprises at least the following information: the operating parameter that was measured; a value of the measurement; and a measurement time indicating a time when the measurement was made; the method comprising:

using a transmitting device, which is communicatively linked to each of the sensors, to transmit the measured values within the data packets in accordance with a transmittal protocol; and using a receiving device to receive the measured values transmitted within the data packets from the transmitting device in accordance with a receiving protocol;

wherein the transmittal protocol comprises the transmitting device applying the following steps to the measured values of the operating parameters provided to the transmitting device by each of the sensors, as exemplified with reference to a first sensor of the sensors:

determining a most recent measured value for the first sensor;

selecting previous measured values for the first sensor, the previous measured values each comprising ones of the measured values that occur previous to the most recent measured value based on the respective measurement times;

comparing the most recent measured value to the previous measured values to determine a difference therebetween; and conditionally transmitting the most recent measured value based on the difference;

wherein the receiving protocol comprises the steps of:

determining a most recent received measured value for each of the sensors;

deriving an analytic time based the most recent received measured values for each of the sensors; and deriving a time-aligned value for at least one of the operating parameters measured by the sensors at the analytic time.

20. The method according to claim 19, wherein the step of deriving an analytic time comprises:
formulating a group with the most recent received measured values for each of the sensors;
selecting from the group an oldest of the most recent received measured values based on the measurement time for each; and
designating the measurement time of the oldest of the most recent received measured values as the analytic time;
wherein the receiving protocol further comprises the step of deriving a time-aligned set of parameter values, the time-aligned set of parameter values comprising a value for each of the operating parameters at the analytic time.

* * * * *